UNITED STATES PATENT OFFICE.

ARTHUR M. COMEY, OF CHESTER, DELAWARE, ASSIGNOR, BY MESNE ASSIGNMENTS, TO E. I. DU PONT DE NEMOURS AND COMPANY, A CORPORATION OF DELAWARE.

EXPLOSIVE AND PROCESS OF PRODUCING THE SAME.

1,301,105.      Specification of Letters Patent.      Patented Apr. 22, 1919.

No Drawing.      Application filed June 28, 1912. Serial No. 706,318.

*To all whom it may concern:*

Be it known that I, ARTHUR M. COMEY, of Chester, in the county of Delaware, and in the State of Pennsylvania, have invented a certain new and useful Improvement in Explosives and Processes of Producing the Same, and do hereby declare that the following is a full, clear, and exact description thereof.

My invention relates particularly to the production of an explosive containing a nitrated sugar. Nitrated sugars have been used before as explosives but it has been found in practice that they are unstable.

The object of my invention is to produce an explosive containing a nitrated sugar which is perfectly stable and may be used for commercial purposes without danger of accidental explosions because of any instability of the product.

I have discovered that explosives containing nitrated sugars may be rendered stable by making use of a nitrated sugar in the presence of nitroglycerin, and subjecting this mixture to the treatment of a soda solution to stabilize it.

My invention comprises an explosive containing a nitrated sugar which may be rendered stable in any desired manner. As one illustrative form of my invention, however, I may proceed as follows:

I dissolve a quantity of sugar, such for example, as cane sugar, in a quantity of glycerin, the proportions being from 80% to 20% of sugar to 20 % to 80% of glycerin. The glycerin and sugar are then subjected to the action of mixed nitric and sulfuric acids so as to nitrate both the sugar and the glycerin. When the nitration has been completed, the waste acids are removed. The nitrated sugar and the trinitroglycerin are then treated with a solution of sodium carbonate, bicarbonate, or hydroxid in water. This treatment renders the explosive containing nitrated sugar very stable. In carrying out the process, the sugar may be dissolved in the glycerin before the glycerin is introduced into the nitrator or just before the addition of the mixed acid, and the sugar and glycerin may be simultaneously or alternately introduced into the nitrator or the mixed acid. In carrying out the process, the procedure may, if desired, be as follows:—

Twenty parts of sugar such as cane sugar are dissolved in 80 parts of glycerin, and 15 parts of this mixture are nitrated with 100 parts of a mixed acid of the approximate composition: sulfuric acid 62%, nitric acid 38%. When the nitration is complete the solution or mixture of trinitroglycerin and nitrated sugar is separated from the spent acid and stirred until neutral with a 6% solution of sodium carbonate, in water, at a temperature of about 70–100° F. I may use instead of the sodium carbonate, another alkali such as sodium bicarbonate or hydroxid. The alkali solution is then drawn off and the nitrated mixture is washed with pure water at a temperature of 70–100° F. The mixture of trinitroglycerin and nitrated sugar is then pure, and ready for use.

While I have described above my method of preparing my new stable explosive, I do not limit myself to the specific proportions, temperatures, etc., described above. I may use acids of various strengths, either anhydrous, or containing up to several per cent. of water. I may use different proportions of glycerin, sugar and mixed acid, different alkaline agents, different strengths of alkali solution, and different temperatures of treatment. All these can be varied, just as they can in the manufacture of nitroglycerin. I may also add the sugar and glycerin separately to the mixed acid, instead of dissolving the sugar in the glycerin beforehand, or the sugar may be in suspension in the glycerin instead of in solution when the mixture of the two is added to the mixed acid. In any case the nitrated product is a mixture or solution of nitrated sugar in nitroglycerin, which is purified as described above, and which is a stable explosive.

I claim:

1. The process which comprises forming a mixture of a nitrated sugar and trinitroglycerin by nitrating a mixture consisting of sugar and glycerin, and then stabilizing the mixture.

2. The process which comprises forming a mixture of nitrated cane sugar and trinitroglycerin by nitrating a mixture of cane sugar and glycerin, and then stabilizing the mixture.

3. The process which comprises forming a mixture of a nitrated sugar and nitroglycerin by nitrating a mixture consisting of sugar and glycerin with a mixture of nitric and sulfuric acids, and then stabilizing the mixture.

4. The process which comprises forming a mixture of nitrated cane sugar and nitroglycerin by nitrating a mixture of cane sugar and glycerin with a mixture of nitric and sulfuric acids, and then stabilizing the mixture.

5. The process which comprises forming a mixture of a nitrated sugar and trinitroglycerin by nitrating a mixture consisting of sugar and glycerin, and then stabilizing the mixture with a soda solution.

6. The process which comprises forming a mixture of nitrated cane sugar and trinitroglycerin by nitrating a mixture of cane sugar and glycerin, and then stabilizing the mixture with a soda solution.

7. The process which comprises forming a mixture of a nitrated sugar and nitroglycerin by nitrating a mixture consisting of sugar and glycerin with a mixture of nitric and sulfuric acids, and then stabilizing the mixture with a soda solution.

8. The process which comprises forming a mixture of nitrated cane sugar and nitroglycerin by nitrating a mixture of cane sugar and glycerin with a mixture of nitric and sulfuric acids, and then stabilizing the mixture with a soda solution.

9. An explosive consisting of a stabilized mixture of nitrated cane sugar and trinitroglycerin.

10. An explosive containing a stabilized mixture of nitrated cane sugar and trinitroglycerin.

11. The process which comprises forming a mixture of a nitrated sugar and trinitroglycerin by nitrating a mixture consisting of 80 to 20% sugar and 20 to 80% glycerin and then stabilizing the mixture.

12. The process which comprises forming a mixture of a nitrated sugar and trinitroglycerin by nitrating a mixture consisting of 80 to 20% sugar and 20 to 80% glycerin and then stabilizing the mixture, by the addition of a soda solution.

In testimony that I claim the foregoing I have hereunto set my hand.

ARTHUR M. COMEY.

Witnesses:
 HENRY W. JONES,
 MARIE B. JOHNSON.